United States Patent [19]

Marsh

[11] Patent Number: 5,312,078
[45] Date of Patent: May 17, 1994

[54] CABINET CORNER BRACE

[75] Inventor: Thomas R. Marsh, Winston-Salem, N.C.

[73] Assignee: Tenn-Tex, Inc., Wallburg, N.C.

[21] Appl. No.: 8,270

[22] Filed: Jan. 25, 1993

Related U.S. Application Data

[63] Continuation of Ser. No. 710,801, Jun. 5, 1991, abandoned.

[51] Int. Cl.⁵ .............................................. A47B 96/06
[52] U.S. Cl. .................................. 248/220.1; 248/903; 403/231; 403/403
[58] Field of Search ............... 248/220.2, 220.1, 205.1, 248/903; 403/403, 382, 231

[56] References Cited

U.S. PATENT DOCUMENTS

| | | | |
|---|---|---|---|
| 939,005 | 11/1909 | Goedeke | 248/220.1 X |
| 1,313,113 | 8/1919 | Pleister | 248/903 X |
| 1,572,295 | 2/1926 | Kofsky | 248/220.2 |
| 3,544,053 | 12/1970 | Ingalls | 248/903 X |
| 4,039,131 | 8/1977 | Perrault | 248/903 X |
| 5,002,249 | 3/1991 | Meyer | 248/903 X |

Primary Examiner—Ramon O. Ramirez
Attorney, Agent, or Firm—Bell, Seltzer, Park & Gibson

[57] ABSTRACT

A corner brace which can support an inner cabinet shelf during shipping of the cabinet, and serves to secure a cabinet top in place, is disclosed. The brace is comprised of an angle member having a pair of arm members oriented substantially perpendicularly to one another. The arm members have a flat planar top edge portion oriented substantially parallel with one another. A shelf member interconnects each of the arm member front portions at a position spaced beneath the arm member top edge portions, the shelf member having a bottom portion and a flat planar top portion oriented parallel with the arm member top edge portions. The shelf member has an outer edge portion interconnecting the arm members, and also has an opening formed therein between the top portion and the bottom portion. An elongate reinforcing rib member is connected to the shelf member bottom portion adjacent the outer edge portion, the rib member interconnecting and extending continuously between the arm members. A reinforcing boss member is formed on the shelf member bottom portion around the opening to further rigidify the brace.

10 Claims, 3 Drawing Sheets

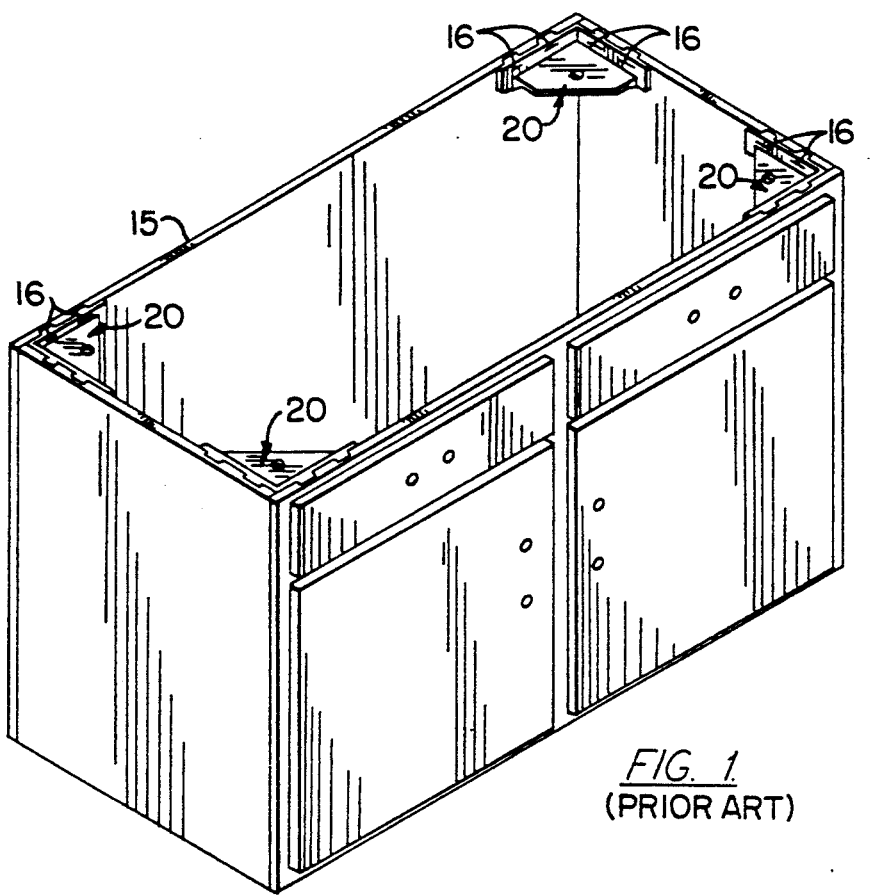
FIG. 1
(PRIOR ART)
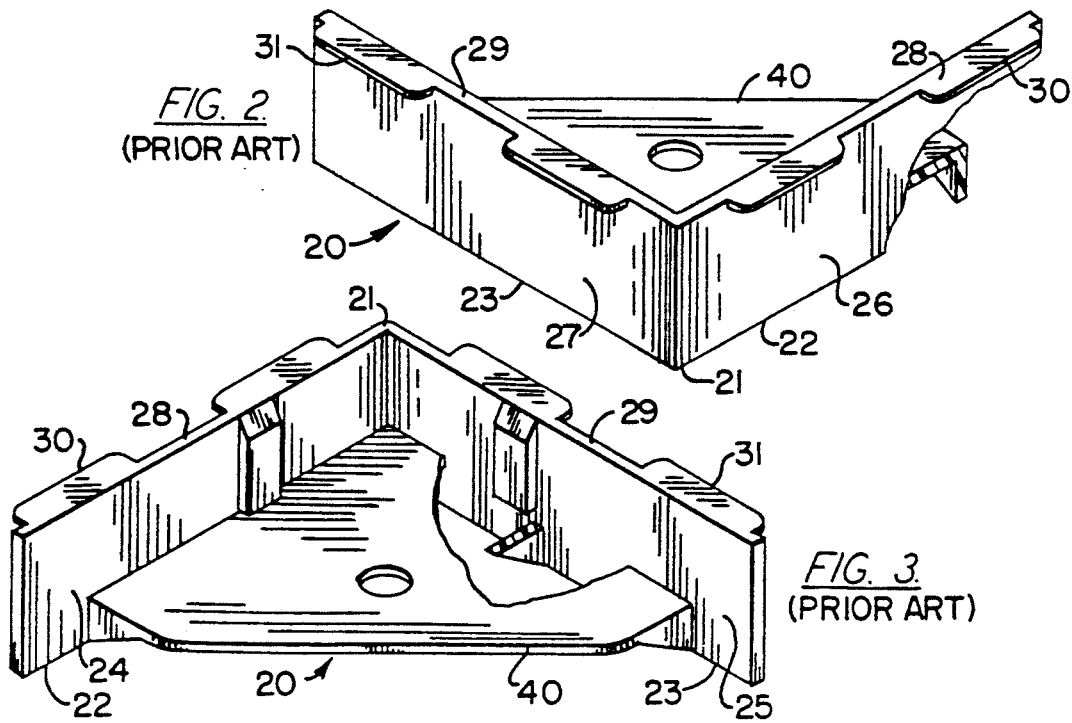
FIG. 2
(PRIOR ART)
FIG. 3
(PRIOR ART)

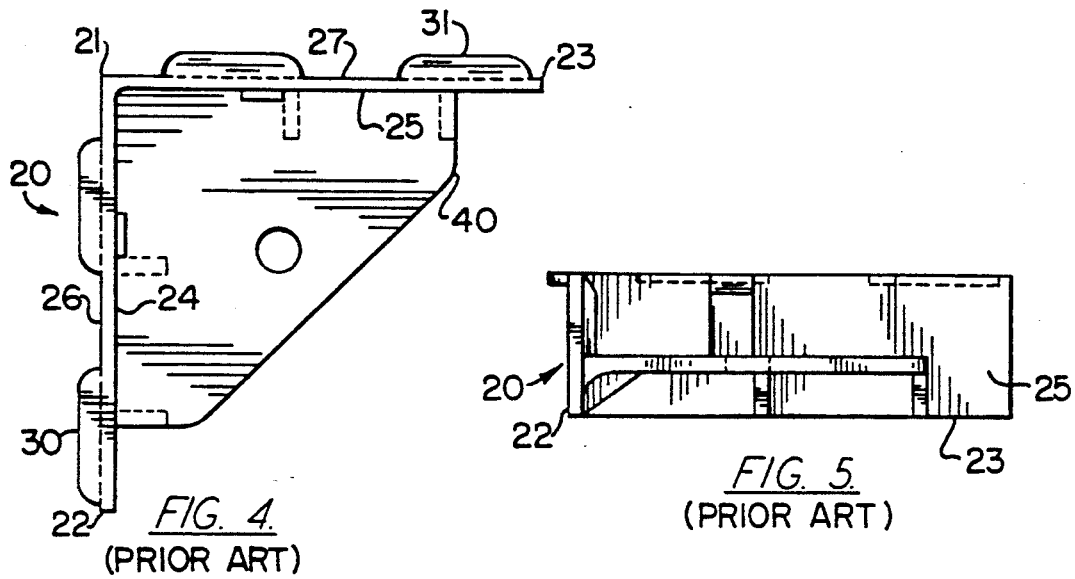
FIG. 4. (PRIOR ART)
FIG. 5. (PRIOR ART)
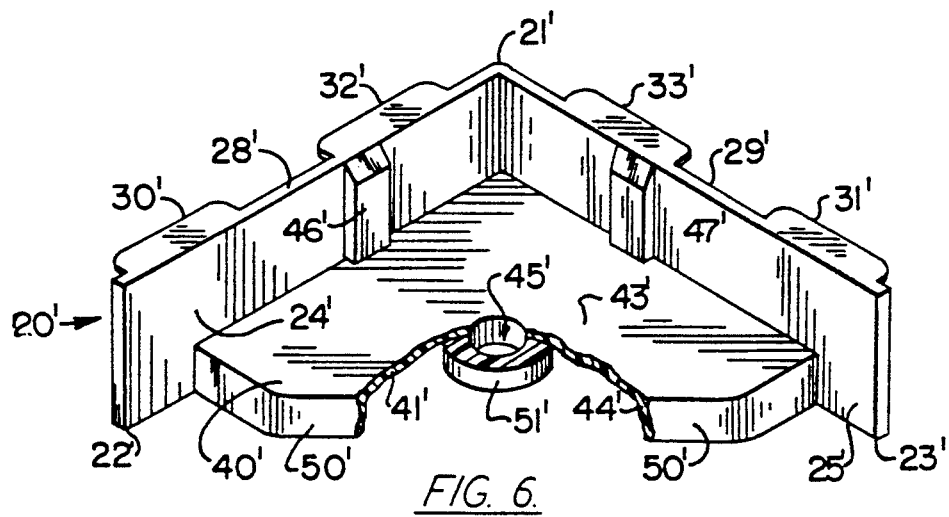
FIG. 6.
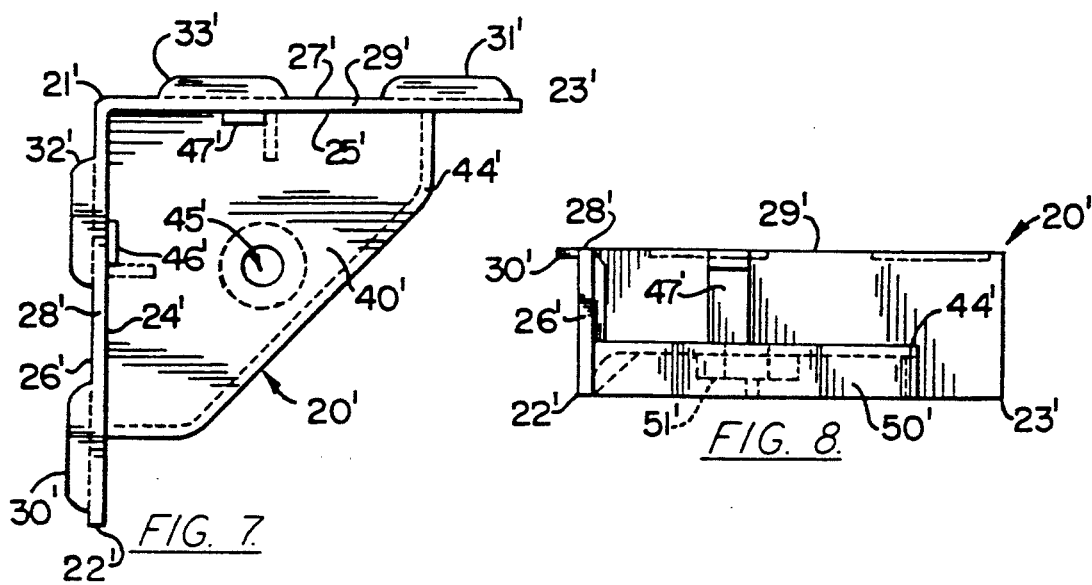
FIG. 7.
FIG. 8.

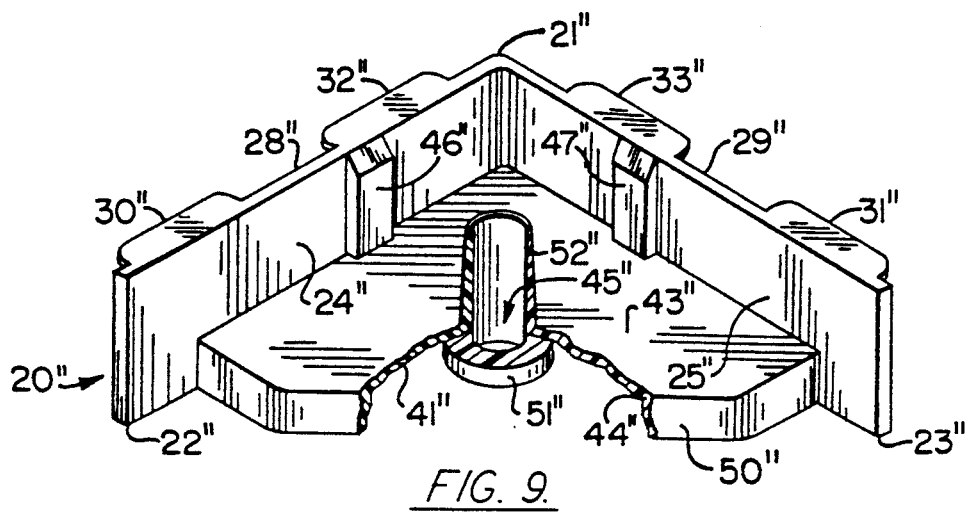
FIG. 9.
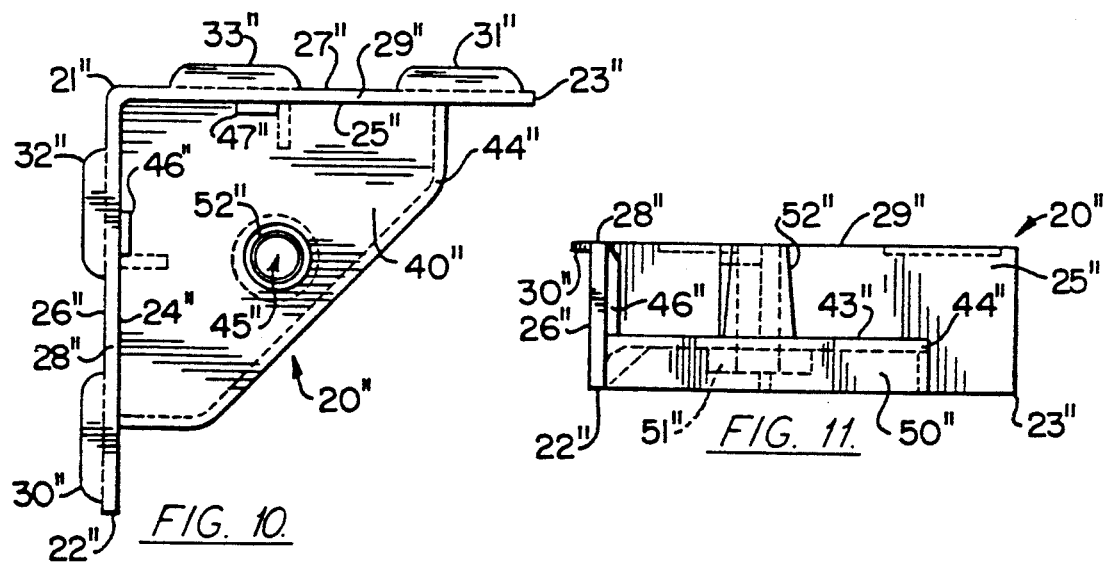
FIG. 10.
FIG. 11.

CABINET CORNER BRACE

This application is a continuation of application Ser. No. 07/710,801, filed Jun. 5, 1991, abandoned.

FIELD OF THE INVENTION

The present invention relates to corner braces in general, and particularly relates to corner braces useful in the cabinetry field.

BACKGROUND OF THE INVENTION

Cabinets, particularly kitchen cabinets, are frequently manufactured without the top surface or counter installed. This permits the cabinet to be delivered to a customer and the appropriate countertop custom installed. However, without the added rigidity provided by an installed top surface, the cabinets must be braced during shipping to prevent their collapse.

Cabinets are often shipped with an inner shelf. In this case, it would be desireable to have a corner brace which could also provide temporary support for the shelf during shipping. Prior corner braces do not serve well in this capacity.

When the top surface of a cabinet is installed, it is typically necessary to employ means such as an angle iron to fasten the top surface in place. It would be clearly desireable to eliminate the need for an angle iron or the like and, in this regard, desireable to employ a corner brace which could also serve as a means for fastening the cabinet top in place. Again, prior corner braces do not serve well in this capacity.

In view of the foregoing, a first object of the present invention is to provide a corner brace which will rigidify cabinets during shipping.

A second object of the present invention is to provide a corner brace which can be used as a support for an inner cabinet shelf during shipping.

A third object of the present invention is to provide a corner brace which can be used as a fastener to secure a cabinet top in place.

SUMMARY OF THE INVENTION

The foregoing and other objects and advantages are achieved by the corner brace disclosed herein. In a first embodiment of the invention, the corner brace is comprised of an angle member having a pair of arm members oriented substantially perpendicularly to one another, each of the arm members having a flat planar front portion and a flat planar back portion. The arm members further have a flat planar top edge portion oriented substantially parallel with one another. Also included are a pair of lip members, one of the lip members connected to each of the arm members, with the lip member connected to each of the respective arm member back portions adjacent the top edge portion and extending laterally outward from the back portion. A shelf member interconnects each of the arm member front portions at a position spaced beneath the arm member top edge portions, the shelf member having a bottom portion and a flat planar top portion oriented parallel with the arm member top edge portions. The shelf member has an outer edge portion interconnecting the arm members, and also has an opening formed therein between the top portion and the bottom portion. An elongate reinforcing rib member is connected to the shelf member bottom portion adjacent the outer edge portion, the rib member interconnecting and extending continuously between the arm members. In a preferred embodiment, a reinforcing boss member is formed on the shelf member bottom portion around the opening to further rigidify the brace.

A second embodiment of the present invention is a corner brace comprised of an angle member having a pair of arm members oriented substantially perpendicularly to one another, each of the arm members having a flat planar front portion and a flat planar back portion. The arm members further have a flat planar top edge portion oriented substantially parallel with one another. A pair of lip members are provided, one of the lip members connected to each of the arm members, with the lip member connected to each of the respective arm member back portions adjacent the top edge portion and extending laterally outward from the back portion. A shelf member interconnects each of the arm member front portions at a position spaced beneath the arm member top edge portions, the shelf member having a bottom portion and a flat planar top portion oriented parallel with the arm member top edge portions, the shelf member further having an outer edge portion interconnecting the arm members, the shelf member having an opening formed therein between the top portion and the bottom portion. An elongate spacing member is connected to the shelf member top portion and extending perpendicularly outward therefrom, the spacing member having a length equal to the distance between the shelf member top edge portion and the arm member top edge portions.

BRIEF DESCRIPTION OF THE DRAWINGS

FIG. 1 is a perspective view of a cabinet containing a prior art corner brace in each upper corner thereof;

FIG. 2 is a perspective view of the prior art corner brace shown in FIG. 1, as viewed from the rear thereof with a portion cut away;

FIG. 3 is a perspective view of the prior art corner brace shown in FIG. 2, as viewed from the front thereof with a portion cut away;

FIG. 4 is a top plan view of a prior art corner brace of as shown in FIG. 2;

FIG. 5 is a side view of the prior art corner brace shown in FIG. 2;

FIG. 6 is a front perspective view of a corner brace of the present invention, with a portion thereof cut away;

FIG. 7 is a top plan view of the corner brace shown in FIG. 6;

FIG. 8 is a side view of the corner brace shown in FIG. 6;

FIG. 9 is a front perspective view of a second embodiment of the present invention, with a portion thereof cut away;

FIG. 10 is a top plan view of the corner brace shown in FIG. 9; and

FIG. 11 is side view of the corner brace shown in FIG. 9.

DETAILED DESCRIPTION OF THE PREFERRED EMBODIMENTS

The present invention is best envisioned by comparison first with the closest prior art, which is illustrated in FIG. 1 through FIG. 5. As disclosed therein, a prior art corner brace 20 is secured with staples 15 into a cabinet 16. Each corner brace 20 is comprised of an angle member 21 having a pair of arm member 22,23 oriented substantially perpendicularly to one another. Each of the arm members has a flat planar front portion 24,25 and a flat planar back portion 26,27. Each arm members further has a flat planar top edge portion 28,29 oriented substantially parallel with one another. A pair of lip members 30,31 is provided, with one of the lip members connected to each of the arm members 22,23. More particularly, each lip member is connected to each of the respective arm member back portions 26,27 adjacent the top edge portion 28,29 and extends laterally outward from the back portion 26,27. A brace member 40 interconnects each of the arm member front portions 24,25 at a position spaced beneath the arm member top edge portions 28,29. This part was made with injection molded of polyethylene. In use, as shown in FIG. 1, the corner brace 20 is secured into each top corner of a cabinet 15 with suitable fasteners, typically staples 16, which penetrate through each arm in the space between the brace member and the top edge portions. Indeed, this corner brace was constructed with the brace member spaced below the top edge portions for the purpose of permitting quick and easy fastening of the brace with a conventional staple gun.

In contrast, a first embodiment of the present invention is illustrated in FIG. 6 through FIG. 8. A corner brace 20' of the present invention is comprised of an angle member 21' having a pair of arm members 22',23' oriented substantially perpendicularly to one another. Each of the arm members has a flat planar front portion 24',25' and a flat planar back portion 26',27'. Each arm members further has a flat planar top edge portion 28',29' oriented substantially parallel with one another. A pair of lip members 30',31' is provided, with one of the lip members connected to each of the arm members. More particularly, each lip member is connected to each of the respective arm member back portions adjacent the top edge portion and, extends laterally outward from the back portion. In the illustrated embodiment, a second lip member 32',33' is connected to each of the arm members, with each of the lip members connected to each of the respective arm member back portions adjacent the top edge portion and extending laterally outward from the back portion. It will be appreciated that the purpose of lip members 30',31',32' and 33' is to position the brace at the top corner of a cabinet when the brace is to be fastened therein. Numerous configurations of lip members different from that illustrated which are also capable of achieving this purpose will be apparent to those skilled in the art.

A shelf member 40' interconnects each of the arm member front portions 24',25', at a position spaced beneath the arm member top edge portions Each shelf member has a bottom portion 41' and a flat planar top portion 43' oriented parallel with the arm member top edge portions 28',29'. The shelf member has an outer edge portion 44' interconnecting the arm members. In addition, the shelf member has an opening 45' formed therein between the top portion and the bottom portion. The opening 45' is positioned mid-way between (or equidistant from) the two arms 22',23' and is round in shape, though other configurations are also suitable. A strut member 46', 47' is formed on each of the arm member front portions, each of the strut members extending between the shelf member and the top edge portions.

Unlike the device shown above in FIGS. 1-5 above, the corner brace of the first embodiment of the inventions (FIGS. 6-9) has an elongate reinforcing rib member 50', best seen in FIG. 8, connected to the shelf member bottom portion adjacent the outer edge portion.

The rib member interconnects and extends continuously between the arm members 22',23'. Further, a reinforcing annular boss member 51', best seen in FIG. 6, is formed on the shelf member bottom portion around the opening.

When corner braces of the present invention are fastened into a unfinished cabinet, in the same manner as the prior corner braces as illustrated in FIG. 1, an important additional advantage is achieved: the shelf members 40' of the corner braces can support a cabinet inner shelf during shipping. Cabinet inner shelves are generally flat planar rectangular members having a length and width dimensioned with respect to the inner length and width of the cabinet to permit the installation thereof within the cabinet. The size of the cabinet inner shelf is such that each corner of the cabinet shelf will rest on the shelf member 40' of a corner brace installed in each top corner of a rectangular cabinet. It will be appreciated that, by carrying the cabinet inner shelf on the corner braces during shipping, considerable structural support is advantageously provided to the unfinished cabinet: structural support much like the structural support achieved when the cabinet top (or countertop) is secured in place.

The corner brace 20' of FIGS. 6-9 is formed of thermoplastic material, preferably polystyrene and particularly preferably high impact polystyrene. The brace can be manufactured by injection molding in accordance with conventional techniques, so that the resulting part is a single integral unit of thermoplastic material. Polystyrenes (including high impact polystyrenes) are suitable for making a corner brace which can be fastened in place by stapling through the arms of the brace with conventional staples in a conventional staple gun, enabling the corner brace of the present invention to provide a completely new advantage (i.e., supporting the cabinet shelf during shipping), while still maintaining the advantage provided by the prior art corner brace (i.e., easily secured in place with staples).

Once a cabinet containing corner braces 20' of the present invention are delivered, yet another advantage is made available. The prior corner brace illustrated in FIGS. 1-5 above is not suited for securing the countertop in place: if one attempted to secure a fastener such as a screw through the opening in the corner brace up into the countertop, the plastic material from which it was formed was not sufficiently strong to retain the screw from pulling through the brace member. The reinforcing boss 51' and reinforcing rib 50' of the present invention, however, enable one to fasten a screw (or other suitable fastener) upwards through the corner brace opening 45' and up into a countertop, with the screw being retained in place by the corner brace sufficiently secure to retain the countertop itself in place. This obviates the need for additional parts, such as angle irons, to secure the countertop in place.

A second embodiment of the present invention is illustrated in FIG. 9 to FIG. 11. This embodiment is much like the first embodiment of FIGS. 6-8 above. In the corner brace 20" of the second embodiment, there is an angle member 21" having a pair of arm members 22",23" oriented substantially perpendicularly to one another. Each of the arm members has a flat planar front portion 24",25" and a flat planar back portion 26",27". Each arm member further has a flat planar top edge portion 28",29" oriented substantially parallel with one another. A pair of lip members 31",32" is provided, with one of the lip members connected to each of the arm members. More particularly, each lip member is connected to each of the respective arm member back portions 26",27" adjacent the top edge portion 28",29" and extends laterally outward from the back portion. As in the previous embodiment, a second lip member 33",34" is connected to each of the arm members, and again it will be appreciated that numerous configurations of lip members different from that illustrated will be apparent to those skilled in the art.

As in the first embodiment of the invention, a shelf member 40" interconnects each of the arm member front portions 24",25" at a position spaced beneath the arm member top edge portions 28",29". Each shelf member 40" has a bottom portion 41" and a flat planar top portion 43" oriented parallel with the arm member top edge portions. The shelf member has an outer edge portion 44" interconnecting the arm members 22",23". In addition, the shelf member has an opening 45" formed therein between the top portion 41" and the bottom portion 43". The opening is positioned mid-way between the two arms, and is round in shape, though other configurations or shape and spacing are again suitable. A strut member 46", 47" is formed on each of the arm member front portions, each of the strut members extending between the shelf member and the top edge portions.

Like the first embodiment, the corner brace of the second embodiment (FIGS. 9-11) has an elongate reinforcing rib member 50" connected to the shelf member bottom portion adjacent the outer edge portion. The rib member interconnects and extends continuously between the arm members. A reinforcing annular boss member 51" is again formed on the shelf member bottom portion around the opening.

Unlike the first embodiment of FIGS. 6-8, the corner brace 20" of the second embodiment has an elongate spacing member 52", best seen in FIG. 9, connected to the shelf member top portion and extending perpendicularly outward therefrom. The spacing member 52" has a length (or height) equal to the distance between the shelf member top portion and the arm member top edge portions (by "equal" is meant within tolerances sufficient to achieve the purpose for which the corner brace is intended). As illustrated, the spacing member 52" comprises a tube formed around the opening 45" in the shelf member, though alternate embodiments such as struts and pegs are also suitable. The purpose of the spacing member is to allow particularly secure fastening of a countertop to a cabinet in which the corner brace of the second embodiment is installed. When a countertop is secured to a cabinet containing corner braces of the second embodiment by means of a screw or other threaded fastener through the opening and up into the countertop, it will be appreciated that, by tightening the fastener, the spacing member is compressed against the countertop, but deflection of the shelf member towards the countertop is reduced. This increases the rigidity by which the countertop is secured in place. If desired, a cabinet interior shelf can still be carried by the corner braces of the second embodiment, though it is necessary to bore holes therein or make other similar accommodation for the spacing members.

A corner brace of FIGS. 9-11 is formed of the same materials and manufactured in the same manner as the corner brace of FIGS. 6-8, and is fastened in place in a cabinet with staples or other suitable fastener in like manner to the corner brace of FIGS. 6-8.

The foregoing is illustrative of the present invention, and not to be construed as limiting thereof. The invention is defined by the following claims, with equivalents of the claims to be included therein.

That which is claimed is:

1. A corner brace useful in the manufacture of cabinetry, comprising:
   an angle member having a pair of arm members oriented substantially perpendicularly to one another, each of said arm members having a flat planar front portion and a flat planar back portion; each of said arm members further having a flat planar top edge portion oriented substantially parallel with one another;
   a pair of lip members, one of said lip members connected to each of said arm members, with said lip member connected to each of said respective arm member back portions adjacent said top edge portion and extending laterally outward from said back portion;
   a shelf member interconnecting each of said arm member front portions at a position spaced beneath said arm member top edge portions, said shelf member having a bottom portion and a flat planar top portion oriented parallel with said arm member top edge portions, said shelf member further having an outer edge portion interconnecting said arm members, said shelf member having an opening formed therein between said top portion and said bottom portion; and
   an elongate spacing member connected to said shelf member top portion and extending perpendicularly outward therefrom, said spacing member having a length equal to the distance between said shelf member top portion and said arm member top edge portions.

2. A corner brace as claimed in claim 1, wherein said opening formed in said shelf member is positioned substantially mid-way between said arm members.

3. A corner brace as claimed in claim 1, wherein said opening is round in shape.

4. A corner brace as claimed in claim 1, further comprising a second lip member connected to each of said arm members, with each of said lip members connected to each of said respective arm member back portions adjacent said top edge portion and extending laterally outward from said back portion.

5. A corner brace as claimed in claim 1, further comprising a strut member formed on each of said arm member front portions, each of said strut members extending between said shelf member and said top edge portions 6. A corner brace as claimed in claim 1, wherein said spacing member comprises a tube formed around said opening in said shelf member.

7. A corner brace as claimed in claim 1, wherein said brace is integrally formed of thermoplastic material.

8. A corner brace as claimed in claim 1, wherein said corner brace is integrally formed of polystyrene.

9. A corner brace useful in the manufacture of cabinetry comprising:
   an angle member having a pair of arm members oriented substantially perpendicularly to one another, each of said arm members having a flat planar front portion and a flat planar back portion; each of said arm members further having a flat planar top edge portion oriented substantially parallel with one another;

a pair of lip members, one of said lip members connected to each of said arm members, with said lip member connected to each of said respective arm member back portions adjacent said top edge portion and extending laterally outward from said back portion;

a shelf member interconnecting each of said arm member front portions at a position spaced beneath said arm member top edge portions, said shelf member having a bottom portion and a flat planar top portion oriented parallel with said arm member top edge portions, said shelf member further having an outer edge portion interconnecting said arm members, said shelf member having an opening formed therein between said top portion and said bottom portion.

an elongate reinforcing rib member connected to said shelf member bottom portion adjacent said outer edge portion, said rib member interconnecting nd extending continuously between said arm members; and an elongate spacing member connected to said shelf member top portion and extending perpendicularly outward therefrom, said spacing member having a length equal to the distance between said shelf member top portion and said arm member top edge portions.

10. A corner braced as claimed in claim 9, wherein said spacing member comprises a tube formed around said opening in said shelf member.

* * * * *